(12) United States Patent
Dolivo et al.

(10) Patent No.: US 8,126,811 B2
(45) Date of Patent: Feb. 28, 2012

(54) DOCUMENTING SECURITY RELATED ASPECTS IN THE PROCESS OF CONTAINER SHIPPING

(75) Inventors: Francois Dolivo, Waedenswil (CH); Reto J. Hermann, Buttikon (CH); Dirk Husemann, Adliswil (CH); Michael E. Nidd, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 712 days.

(21) Appl. No.: 10/575,044

(22) PCT Filed: Aug. 20, 2004

(86) PCT No.: PCT/IB2004/002718
§ 371 (c)(1), (2), (4) Date: Mar. 7, 2007

(87) PCT Pub. No.: WO2005/034425
PCT Pub. Date: Apr. 14, 2005

(65) Prior Publication Data
US 2007/0244817 A1  Oct. 18, 2007

(30) Foreign Application Priority Data
Oct. 6, 2003  (EP) .................................... 03022395

(51) Int. Cl.
G06F 21/00  (2006.01)
(52) U.S. Cl. .................. 705/51; 705/22; 705/76; 705/28
(58) Field of Classification Search .............. 705/50–79, 705/22
See application file for complete search history.

(56) References Cited

U.S. PATENT DOCUMENTS

| 5,768,379 A * | 6/1998 | Girault et al. ................. 713/185 |
| 6,456,716 B1 * | 9/2002 | Arnold .......................... 380/277 |
| 7,564,350 B2 * | 7/2009 | Boman et al. ............... 340/545.6 |
| 2003/0011474 A1 | 1/2003 | Ng |
| 2003/0126085 A1 | 7/2003 | Srinivasan |
| 2004/0113783 A1 * | 6/2004 | Yagesh ...................... 340/568.1 |

FOREIGN PATENT DOCUMENTS

| JP | 11-296772 A | 10/1999 |
| JP | 11-345374 A | 12/1999 |
| JP | 2000205892 A | 7/2000 |
| JP | 2000285170 A | 10/2000 |

(Continued)

OTHER PUBLICATIONS

Menezes et al., "Handbook of Applied Cryptography", CRC Press LLC, 1997.*

*Primary Examiner* — Chrystina Zelaskiewicz
(74) *Attorney, Agent, or Firm* — Cantor Colburn LLP; Vazken Alexanian (57) ABSTRACT

There is provided a method and a system for documenting a transfer of authority of control for a container from a first entity of a transportation chain to a second entity of the transportation chain. The first entity transfers an electronic container control certificate to an electronic seal of the respective container, which electronic container control certificate comprises a cryptographic key associated to the second entity, and which container control certificate is digitally signed by the first entity. The container control certificate is stored in a log of the electronic seal.

20 Claims, 5 Drawing Sheets

FOREIGN PATENT DOCUMENTS

| | | |
|---|---|---|
| JP | 2001134729 A | 5/2001 |
| JP | 2001518414 T | 10/2001 |
| JP | 2002023628 A | 1/2002 |
| JP | 2002032609 A | 1/2002 |
| JP | 2002501000 T | 1/2002 |
| JP | 2002056069 A | 2/2002 |
| JP | 2002073760 A | 3/2002 |
| JP | 2002104617 A | 4/2002 |
| JP | 2002259520 A | 9/2002 |
| JP | 2002528801 T | 9/2002 |
| JP | 2002542553 T | 12/2002 |
| JP | 2003063659 A | 3/2003 |
| JP | 2003128254 A | 5/2003 |
| JP | 2003196350 A | 7/2003 |
| JP | 2003196360 A | 7/2003 |
| JP | 2003216708 A | 7/2003 |
| JP | 2003223493 A | 8/2003 |
| JP | 2003233660 A | 8/2003 |
| JP | 2003527778 T | 9/2003 |
| JP | 2005510789 T | 4/2005 |
| WO | 03/019466 A2 | 3/2003 |
| WO | 03046681 A2 | 6/2003 |
| WO | 03/060752 A1 | 7/2003 |

* cited by examiner

DOCUMENTING SECURITY RELATED ASPECTS IN THE PROCESS OF CONTAINER SHIPPING

CROSS REFERENCE AND PRIORITY

This application filed under 35 USC 371, is cross-referenced with, and claims priority from, International Patent Application PCT/IB2004/002718 filed on Aug. 20, 2004, and published in English with Publication No. PCT WO 2005/034425 A1 on Apr. 14, 2005, under PCT article 21(2), which in turn claims priority of EP 03022395.2 filed on Oct. 6, 2003.

FIELD OF THE INVENTION

The invention relates to methods and systems for documenting a transfer of authority of control for a container from a first entity of a transportation chain to a second entity of the transportation chain, to a computing unit for communicating with an electronic seal of a container, to electronic seals, to methods and systems for recording a track of a container on its way from a first location to a second location, and to a location recording device.

BACKGROUND OF THE INVENTION

The United States Department of Transport, the United States Customs and the United States Office for Homeland Security have initiated a Safe and Secure Trading Lanes program: US authorities (a) would like to assert that containers reaching the United States have not been tampered with during their voyage to the United States, (b) would like to establish a complete chain of responsibility from the manufacturer of the goods all the way to the consumer of the transported goods, and (c) would like to assert that cargo/containers have traveled on approved—which means secure and safe—trade lanes only.

While there are already systems available providing electronic container seals—also called e-seals—there are currently no systems available that address the whole problem. The intuitive solution of equipping containers with GPS receivers and storing a continuous track of GPS reading with each container does not work across all possible means of transport: Container ships, for example, regularly have containers stacked ten to twelve levels high with a similar width where only the uppermost GPS receivers would obtain a signal.

There are some documents found in literature dealing with different concepts of container seals:

"Report on Electronic Container Seal Technologies (Task 2)", Chel Stromgren, Aug. 23, 2002, retrieved and accessed on the Internet http://www.ccdott.org/Deliverables/2001/task3.15/task3.15_Summary.pdf on Oct. 1, 2003, describes the technical development of container seals: Starting with passive seals having no power support, today electronic seal are common. An electronic seal is understood in the Stromgren document as a tamper-indicating and identification device which records unauthorized opening of either the doors or the latches that secure the doors on a container. Such electronic seals provide an electronic identification that can be queried during the shipping process and are designed to create a record of any tampering event in-transit. There is a differentiation between indicative seals which indicate tampering events and barrier seals which combine the functions of a seal and a lock. There are active electronic seals which provide an internal power supply and there are passive electronic seals which rely on power provided by external sources.

According to the Stromgren document, querying data from such an electronic seal can be achieved in an interrogating way. Alternatively, the seal can transmit data at periodic intervals. Data that can be stored in an electronic seal are e.g. a cargo manifest or sensor data. An emerging electronic seal technology is introduced in which the electronic seal comprises GPS capabilities for recording a history of the movement path in the electronic seal.

"Technology to Enhance Freight Transportation Security and Productivity", Michael Wolfe, Intermodal Freight Security and Technology Workshop—Long Beach Calif., Apr. 27-29, 2002, retrieved and accessed on the Internet http://ops.fhwa.dot.gov/freight/publications/Security%20Technology%20Appendix,%204-25-02.doc on Jul. 17, 2003 haves a similar overview on seal technologies.

WO 03/007221 A2 introduces an electronic seal based on RFID tag technology.

"Hi-G-Tek", retrieved and accessed on the Internet http://www.higtek.com/cargo.htm on Oct. 6, 2003 introduces commercial electronic seals. Information regarding cargo is written onto an electronic seal by a handheld terminal. During use, a monitoring device mounted on the cab of a truck interrogates the electronic seal at predetermined time intervals which seal transmits back its identity and status. This data is forwarded to a central control center.

It is a desire to have a concept available that supports documenting security related aspects in the process of container shipping.

SUMMARY OF THE INVENTION

According to one aspect of the present invention, there is provided a method for documenting a transfer of authority of control for a container from a first entity of a transportation chain to a second entity of the transportation chain, wherein the first entity transfers an electronic container control certificate to an electronic seal of the respective container, which electronic container control certificate comprises a cryptographic key associated to the second entity, and which container control certificate is digitally signed by the first entity.

Extending the concept of the method as stated above to a plurality of entities involved in the transportation chain, another aspect of the present invention provides a method for documenting a transfer of authority of control for a cargo container from a first entity of a transportation chain via one or more further entities to a last entity of the transportation chain, wherein each entity transferring authority of control transfers an individual electronic container control certificate to an electronic seal of the respective container during the course of transferring authority of control between the entities, which individual electronic container control certificate comprises a cryptographic key associated to the respective next entity in the transportation chain, and which individual container control certificate is digitally signed by the respective transferring entity.

The present concept describes a cryptographically secured hand over process for a container with focus on documenting the transfer of authority of control for the container between different entities in a secure manner. As an extension of this basic concept, there is provided a procedure for documenting hand-over of cargo-containers along the entire transport chain from the supplier of goods to the consumer. Along this path, various entities exercise control over the cargo-containers at different times. The transfer of authority-of-control from one entity to the next entity is accomplished by issuing digital container control certificates based on asymmetric-key cryptography.

A transfer of authority of control for a container from a first entity of a transportation chain to a second entity of the transportation chain can now be documented. The physical hand-over of the container from the entity handing over to the entity taking over is preferably timely linked to the transfer of the data from the entity handing over to the electronic seal for documenting purposes. However, the physical hand over and the writing of container control certificate information into the electronic seal is not necessarily carried out at the roughly same time, as the transfer of authority can also be documented earlier or later than the physical hand over of the container takes place. For documenting purposes as such, it is only necessary to have any transfer of authority of control documented, but not whether the transfer took place at the same time when the actual transfer of authority takes place or when the actual hand over of the container takes place. However, documentation requirements can be more strict such that a transfer of authority of control will only be accepted when the records stored in the electronic seal show that the record was written at the roughly same time when the container was handed over physically. In particular under such circumstances, but also in a more general context, it is preferred to have every entry written time stamped into the log of the electronic seal, i.e. it is indicated and stored into the log at which time the respective entry was written into the log. The time can be provided by an internal clock of the electronic seal, or by the submitting entity, in particular when such external clock can be trusted.

Entities participating in a transportation chain can e.g., be a container supplier, a supplier of goods, different entities providing transport carriers such as ships or trucks, port authorities, stock turnover authorities, the receiver of goods, etc., but not limited to.

The authority of control transferring entity—here named as first entity—transfers an electronic container control certificate to the electronic seal of the respective container for documenting the transfer of authority of control which authority of control—according to the explanations given above—is transferred simultaneously or will be transferred afterwards. The container control certificate is digitally signed by the transmitting entity. There are many ways of signing data digitally somebody skilled in the art is familiar with. By resolving a digital signature—this process is also called verification process, the receiver can assure him/herself that the sender is actually the one he/she claims to be and the receiver can further verify that the information being sent has not been tampered with. Generally encryption/decryption processes will be used for digitally signing respectively verifying a digital signature.

The container control certificate comprises in its physical form electronic data including at least cryptographic information associated to the entity taking over. Thus, the entity handing over has to know who to hand over the authority of control for the container as well as how the cryptographic information/data of the succeeding entity looks like. The entity transferring authority of control can preferably receive a cryptographic key associated to the second entity from a trusted certificate authority, by default or upon request. A delivery of cryptographic information belonging to the entity taking over by the entity handing over is crucial since this information is needed e.g. for the electronic seal for decrypting data to be received in the future from the entity taking over, which data will be encrypted by the entity taking over using its proprietary—e.g. its private—key. So, preferably, the cryptographic information delivered by the entity handing over will comprise a cryptographic key for decrypting data which will be encrypted or will be digitally signed by the succeeding entity. In more general words, related to this aspect of the present invention, when every entity documents a transfer of authority of control to the next entity by the proposed method, every entity handing over provides decrypt information associated to the next entity to the electronic seal for enabling the electronic seal to decrypt data transferred by the next entity. At the same time, from the seal's point of view, upon receipt of a digitally signed container control certificate, the seal has to have the decrypt information associated to the signee of the container control certificate already available in a log of the electronic seal for decrypting/verification purposes. In case there is no decrypt key stored or not the appropriate decrypt key, the verification of the signature fails.

Consequently, documenting a transfer of authority of control in the electronic seal by sending a suitable container control certificate there implies granting another entity the authority to issue and new container control certificate and have it stored in the log of the electronic seal.

If this chain of container control certificate transfers to the electronic seal is interrupted for whatever reason, it can be verified by accessing the electronic seal that the chain of transfer of authority is not proper, since e.g. the seal was at one point in time not able to decrypt data received in encrypted form from an entity, or e.g. some container control certificates are simply not recorded in the seal's log. If the installation of one certificate along the chain falls, all subsequent communication relying on the presence of this certificate will fail, too. In other words, the chain of trust does not have a missing link but ends at this point.

In contrast to the embodiment described latest, where information that can not be verified by the seal will not be recorded in the seal's log, it can also be preferred to record every container control certificate received. By reading the seal and analyzing the signed certificates, any inappropriate certificates can be detected.

Whenever it is mentioned in this context that some information/data is stored in a log, this term comprises storing the data in its bare or decrypted—and thus not encrypted—form, but this term can also comprise storing the respective data in its encrypted form, e.g. on purpose, or for the reason that a decryption process failed. If any container control certificate is stored, there is a maximum of information accessible later on when any attempt to tamper the transport of the container shall be reconstructed.

It is preferred to have a cryptographic system agreed between the participating entities. In this context, it is preferred to have a corresponding decrypt function implemented in the container's electronic seal for verifying received container control certificates. Preferably, the digital signature of the container control certificate received is verified by applying decrypt information stored in the log. Such decrypt information is typically not stored in the log from the beginning—this would foil the basic idea—but should have been delivered to the log by a previous entity of the transportation chain—preferably by the preceding entity, provided the documentation process worked without failure so far. By executing this verification/decryption function, the log is preferably searched for decrypt information associated to the transmitting entity. The verification is considered to be failed if the signed container control certificate cannot be decrypted with the decrypt information stored in the log. Any failure can be registered by a separate, time stamped entry.

Basically, any authentication scheme based on digital signatures can be used. However, specifying more details of what is said in the previous paragraph, it is preferred that an asymmetric cryptographic key system is used for digitally signing the container control certificate. However, when such a system is agreed between the participating entities, the cryptographic information associated to the respective next entity in the chain which information is part of the container control certificate should follow the same asymmetric cryptographic key system for compatibility across the entire chain. In a very preferred embodiment, a public—private key system is used for digitally signing the container control certificate. Preferably, the container control certificate is signed by the transmitting entity using a private key associated to this entity. Accordingly, it is preferred to include a public key of the succeeding entity in the container control certificate. In this scenario, the seal's log should already provide a public key associated to the transmitting entity for signature verification purposes.

According to different embodiments of the present aspects of the invention, there can be a variety of control actions taken subject to the result of the verification. E.g. a status of a container lock can be subject to the result of the signature verification process, provided that the electronic seal is designed for controlling a lock of the container. According to another embodiment, the electronic seal can issue a warning if the verification of the signature fails. This warning can be visible at the container or the electronic seal, or it can be designed in form of a message issued via some communication interface to some trusted entity. However, also any logging of information can be subject to the result of the verification wherein the decrypted container control certificate will only be stored in the log of the electronic seal if the verification succeeds.

The electronic seal preferably comprises additional functions known electronic seals comprise, such as the monitoring of environmental parameters such as vibrations, temperature, radiation, etc., as reported by sensors connected to the electronic seal or communicating with it. Other additional functions can comprise the retrieval of the logged information. Read access could then be provided to different sorts of logged information depending on who tries to access.

The container control certificate preferably comprises also identification data for the container. Implicitly, rights can be associated to a container control certificate, e.g. the right to read the certificate track from the seal's log, the right to read a cargo manifest stored in the seal's log, or the right to install new certificates. The electronic seal can provide a table including a listing of rights assigned to different entities which table is checked before any data is delivered from the seal to any requesting entity. Information will then only be delivered to the requesting entity if the requesting entity has the right to read such information from the seal according to the "rights"-table.

According to another aspect of the present invention there is provided a computing unit for communicating with an electronic seal of a container, the computing unit comprising an interface for transferring data to the electronic seal, and a control unit designed for assembling an electronic container control certificate, the container control certificate comprising a cryptographic key associated to an entity different from the entity the computing unit is associated to, for digitally signing the container control certificate on behalf of the associated entity, and for submitting the digitally signed container control certificate to the interface.

This aspect reflects the invention from an entity's point of view and claims an apparatus associated to an entity of the transportation chain necessary to implement the documentation of a transfer of authority of control.

The following aspect of the invention claims the apparatus counterpart to the computing unit which counterpart is the electronic seal for a container. Accordingly, there is provided an electronic seal, the seal comprising an interface accessible for entities participating in the transportation chain, a log for recording data, and a control unit for verifying data received via said interface, the control unit being designed for decrypting a digitally signed electronic container control certificate received via said interface, the decryption process using decrypt information stored in the log which decrypt information being associated to the transmitting entity.

Combining a computing unit associated to an entity as mentioned above with an electronic seal associated to the container results in a system for documenting a transfer of authority of control for a container from a first entity of a transportation chain to a second entity of the transportation chain which is provided according to another aspect of the present invention.

Extending this system to the entire transportation chain and involving all participating entities in the documenting process, there is provided a system for documenting transfer of authority of control for a cargo container from a first entity of a transportation chain to a last entity of the transportation chain, the transportation chain comprising one or more further participating entities, the system comprising a computing unit associated to each of the entities transferring authority of control, and an electronic seal which electronic seal is associated to the container.

A computing unit as provided above preferably comprises an interface for communicating to a certificate authority. Then, its control unit can be designed for requesting a cryptographic key associated to a different entity from the certificate authority. These means are preferred for supporting the computing unit respectively the associated entity in getting knowledge about the cryptographic key of the subsequent entity, which key is a substantial part of the container control certificate to be transmitted to the electronic seal. This cryptographic key can then be assembled with further data—e.g. concatenated—for building the container control certificate which then can be digitally signed and transmitted.

In case the certificate authority delivers encrypted or digitally signed data, it is preferred that the computing unit comprises a log for storing a cryptographic key associated to the certificate authority for decrypting information received from the certificate authority via the certificate authority interface.

In the following, preferred embodiments of the electronic seal are listed. Many of the preferred embodiments were already mentioned with regard to the methods introduced above and are listed here for completeness purposes only. However, it is emphasized that all features of embodiments and corresponding advantages described with regard to a method shall also considered to be disclosed related to the corresponding apparatus or system and vice versa.

It is preferred that the seal's control unit stores the signed container control certificate in the log. It is preferred that the control unit is designed for considering the verification being failed if the signed container control certificate cannot be decrypted with the decrypt information stored in the log. According to another preferred embodiment of the electronic seal, the seal's control unit is designed for controlling a lock of the associated container, and a status of the container lock is subject to the result of the signature verification process. According to a further embodiment of the electronic seal, the corresponding control unit is designed for issuing a warning if the verification of the signature is considered to be failed. Preferably, the control unit is designed for storing the container control certificate in the log if the verification succeeds.

Preferably, the decrypt information comprises a public key of the first entity in case a private—public key signing mechanism is used for signing the container control certificate at the transmitting entity.

According to a further aspect of the present invention, a method is provided that comprises the steps that are indicated to be performed by the control unit of the electronic seal.

With regard to the proposed systems and the corresponding methods, there are some more preferred embodiments listed in the following:

The system as proposed can be extended according to a preferred embodiment, wherein the extension comprises a certificate authority for supporting the computing unit with cryptographic data as needed. Such certificate authority can be embodied as holder of all cryptographic keys involved in the transfer of authority of control process. Such certificate authority can be set up as a trusted authority for administrating purposes.

When every entity is complying with the way of transmitting its individual container control certificate, each individual container control certificate will preferably be stored in a log of the electronic seal.

Each entity cannot only transmit its individual container control certificate. There might be a need for one or the other entity to make further data available to the electronic seal for documenting and tracking purposes. The following preferred embodiments reflect such additional data that might be sent to the electronic seal and logged there:

The entity providing the container preferably issues identification data for the container and transfers such identification data to the electronic seal. The electronic seal stores the identification data in its log. This information is preferably the first one in a row that is transmitted to the electronic seal and be logged there. The first entity of the transportation chain is in most of the times the container provider. Thus, the container provider initiates the electronic seal and transmits the container identification data. The container identification data is preferably also part of a container control certificate, as indicated earlier. Container identification data can e.g. comprise a container ID, the address of the container provider, the telephone number, etc.

In addition or alternatively, the container provider assembles an electronic container provider certificate, digitally signs this container provider certificate with a key associated to a certificate authority and transfers the signed container provider certificate to the electronic seal. The electronic seal stores the container provider certificate in its log. Such a container provider certificate is preferably issued by the certificate authority. It is used by the container provider or any other entity first in the transport chain and installed into the electronic seal to get the chain started which allows all subsequent information sent to the electronic seal to be authenticated. In case the container provider is such first entity in the transportation chain, this is the only entity that can install something into the electronic seal in an unauthenticated manner, i.e. by the time it installs the certificate no other certificate is present and hence the installation cannot be authenticated. Such container provider certificate preferably comprises identification data of the container provider and its public key, signed with the private key of the certificate authority.

According to another preferred embodiment, the entity supplying the cargo issues an electronic cargo manifest which cargo manifest comprises data about the cargo to be delivered, digitally signs the cargo manifest and transfers the signed cargo manifest to the electronic seal. The electronic seal stores the cargo manifest in its log. This entry into the log primarily enables the last receiving entity in the transportation chain to check the goods in the container against the cargo manifest.

According to another aspect of the present invention, there are provided apparatus, methods and systems for documenting the path/track a container takes, in particular for enabling later on verification whether the container stayed on predetermined paths. In particular when combining these aspects of the invention with the aspect of documenting a transfer of authority of control, a seamless documentation chain can be set up for a container on its way from sender to receiver. However, the aspect of recording the track of a container in an appropriate way can also independently serve the overall goal of documenting secure related aspects in the process of container shipping.

This aspect addresses the problem of container tracking and ensures that a container has not been transported outside of defined secure and safe trading lanes. Accordingly, there is provided a location recording device for recording a track of a container, the location recording device comprising a location detector for detecting the actual location, a log for recording location data, an interface for communicating with an electronic seal of a remote container to be tracked, and a control unit designed for recording location information to the log, and for exchanging data with the electronic seal via the interface.

Due to the fact that especially on ships container themselves do not necessarily have access to a global positioning system, it is preferred to provide a separate location recording device that is typically installed on the container carrying vessel or vehicle at a location where access to a location detecting system is granted. Whenever the location of an electronic seal respectively the associated container is declared as remote from the location recording device, it is understood that recording device and electronic seal are located on/at the same vessel or vehicle, however at different locations on this vessel respectively the vehicle.

However, simply recording the track of the vessel by a device located on the vessel does not necessarily mean that containers took the same route the vessel did. Containers might be unloaded somewhere during the transport or exchanged. Consequently, there is provided a communication link to a container's electronic seal. Such a link might be implemented such that an exchange of a container during the transport cannot be achieved without getting visible in recorded entries as e.g. the range of the link is limited to a few metres—preferred for vehicles—or a few ten metres—preferred for vessels.

According to a first variant of this aspect of the present invention, the location recorder receives container identification information from the electronic seal, e.g. on a periodic basis or upon request. This container identification information is then linked to location information detected preferably at about the same time the container identification information was received and stored together with the location information to the log.

According to another variant, the interface to the electronic seal is used for transmitting the detected location data to the electronic seal. The seal then secures this location information to its local log, preferably together with a time stamp. In addition the location information can be logged into the log of the location recorder.

While the latter variant allows to verify the secure and safe trading lane requirement (SSTL requirement) for each container individually during any given trip at the cost of additional hardware, the first variant allows for less expensive hardware with each container and instead places the burden with the transport provider. Note that the two different variants can be combined or used stand-alone.

Preferably, the location detector comprises a global positioning module for determining the actual location, e.g. by support of the Global Positioning System (GPS).

Also, any location information recording at the location information recorder is preferably time stamped.

In particular, related to the second variant as stated above, location information sent to an electronic seal is preferably signed with a digital signature.

From a seal's point of view, there is provided an electronic seal for a container, the electronic seal comprising an interface for communicating with a remote location recording device, and a control unit for verifying data received via said interface, the control unit being designed for decrypting digitally signed location data received via said interface.

Preferably, the seal comprises a log for recording data, in particular for storing received location data if the signed location data can be decrypted by means of decrypt information stored in the log.

A method corresponding to the first variant of location recording provides at a location recording device the steps of: Detecting the actual location; Receiving container identification information from an electronic seal of a container; Recording the location data together with the container identification information in a log.

A method corresponding to the second variant of location recording provides the following steps at a location recording device: Detecting the actual location; Recording the location data in a log; Transferring this location data to an electronic seal of the container; and at the electronic seal of the container: Receiving the location data; Recording the location data in a log of the electronic seal.

Preferably, the location data is digitally signed by the carrier entity responsible for the transport at this stage of the transport chain before transmitted to the electronic seal, and the signature is verified at the electronic seal. The digital signature of the location data can be verified by applying decrypt information stored in the log of the electronic seal and delivered to the log by a previous entity of the transportation chain. The verification is considered to be failed, if the signed location data cannot be decrypted with decrypt information stored in the log. According to a modification of the present method, the location data is recorded in the log of the electronic seal only when the verification of the signature succeeded. If the verification of the signature failed, the location information will not be recorded in the electronic seal.

The location data is preferably recorded together with a time stamp.

Focusing on evaluating the records, in a preferred embodiment, there is provided a risk manager which checks the records of the location recording device. Preferably, the risk manager is embodied as an entity or device performing the evaluating steps automatically.

The risk manager preferably compares the records of the location recording device with the records of the seal's log. The risk manager issues a note or takes any other action if the records of the location detection unit and the records of the container differ. This means that the location records of the container do not match the location records of the location recorder. Thus, container and location recorder likely have taken a different route to the destination, or the seal log and/or the location recorder log were manipulated.

Related to every method characterizing the invention and its embodiments, there is also provided a corresponding computer program product comprising computer program code means for performing such a method when loaded in a processor unit, wherein the term processor unit can also be understood as distributed processor unit in case several entities are involved in executing a method.

In general, where such a location recording device is applied, the location recording device is typically associated to the carrier entity responsible for carrying the container to a destination. In particular, when a system for documenting the transfer of authority of control for a container is extended for providing a location recording function, the location recording device is added to the system already comprising the computing device for feeding the electronic seal with a container control certificate and the electronic seal. The electronic seal will then be expanded with features related to the location recording function subject to the variant of location recording that will be implemented. It is understood that primarily carrier entities will add a location recording device. Considering a system involving a plurality of entities and associated devices, it is preferred that at least one location recording device is used which location recording device can be handed over between carrier entities for documenting locations in a single device all across the path to the container's destination.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings.

The figures are illustrating.

DETAILED DESCRIPTION OF THE DRAWINGS

Figure 1:
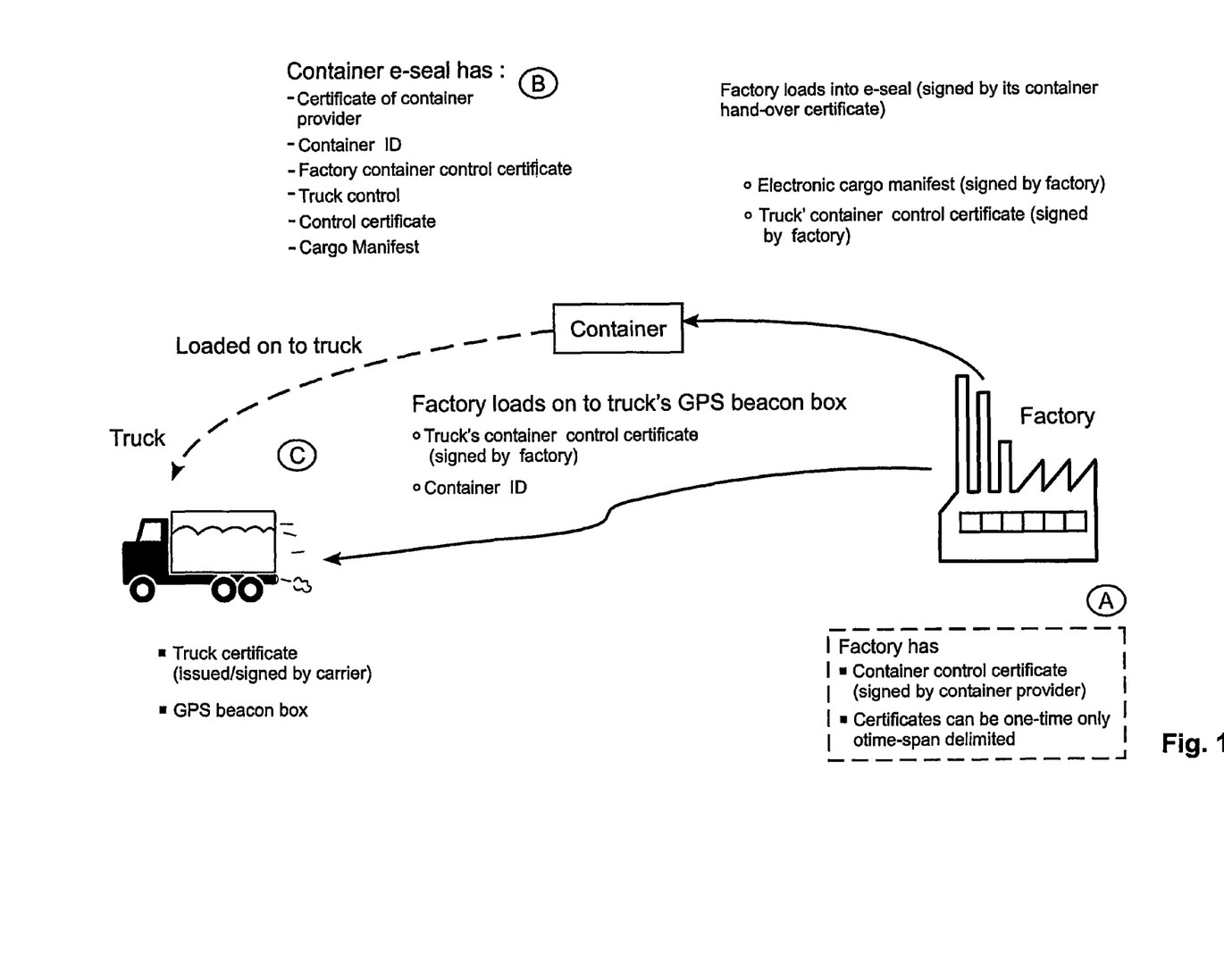
FIG. 1, a first scenario of transfers of authority of control for a container between a container provider, a factory and a truck, FIG. 2 a second scenario of a transfer of authority of control for a container from a truck to a port of authority, FIG. 3 a block diagram of a trade lane including different entities, illustrating the transfer of authority of control from one entity to the next one, FIG. 4, a scenario of container monitoring activities, and FIG. 5, a block diagram of a system.
Figure 2:
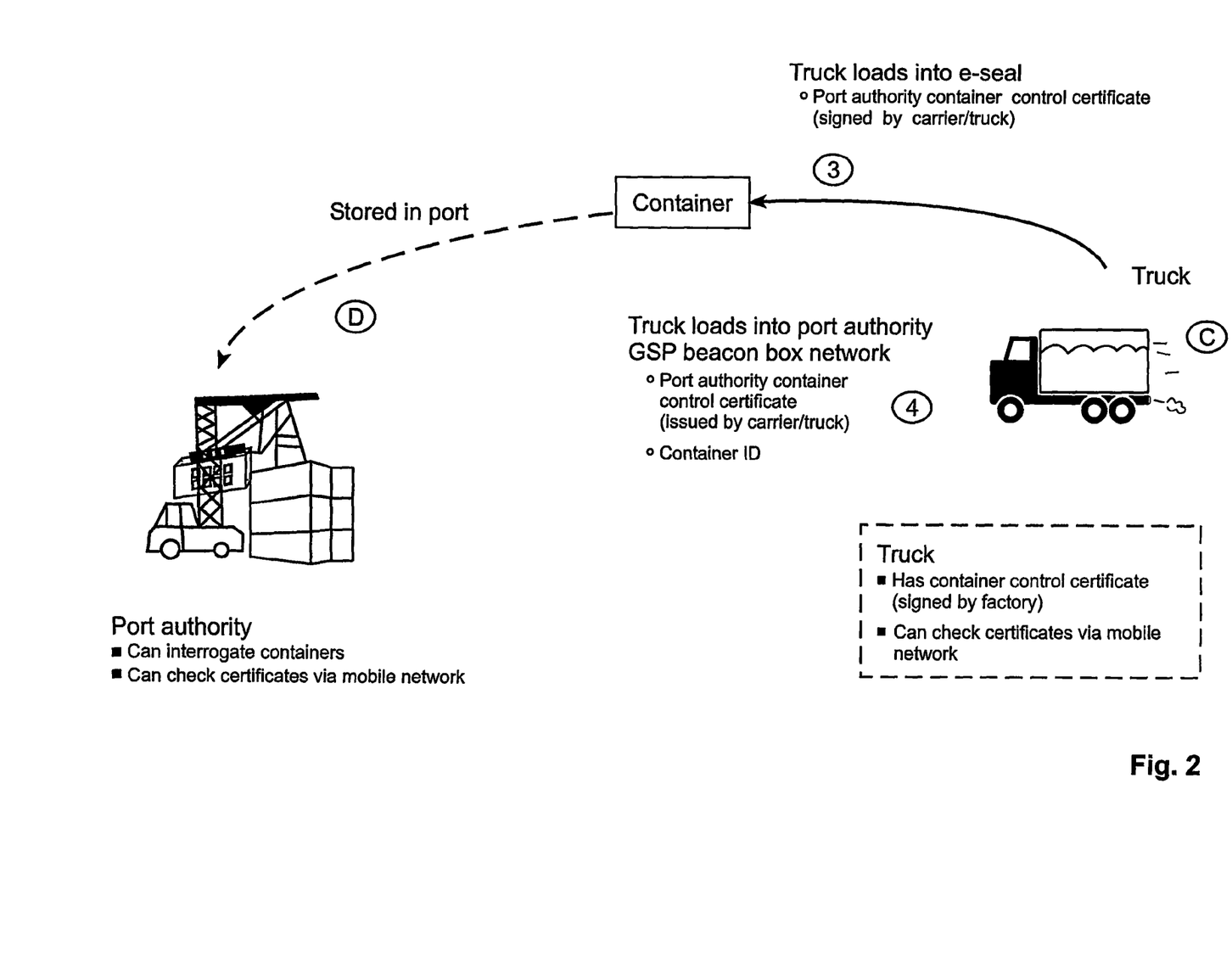

FIG. 1 and FIG. 2 illustrate scenarios of transfers of authority of control for a container between different entities.

FIG. 1 shows a crytographically secured hand-over of a container B from a factory A to a truck C, the truck C representing a carrier entity. A public—private key system is used for digitally signing data to be transferred.

Before the factory A can fill the container B with goods and hand over the filled container B to the truck C, the container B has to be provided to the factory A by a container providing entity. This container provider provides empty containers B to the factory A. This step is not explicitly shown in FIG. 1. Each container B is equipped with an electronic seal. Each container has a unique identifier ID assigned. This container ID may also be interpreted as electronic seal ID where in most of the cases there will be no difference as the ID is identifying the container including its elements. However, in particular with regard to self-monitoring electronic seals which would recognize movements and thus attachments to different containers, container ID and electronic seal ID could be different and co-exist.

Such identification data which can include lots more information than only the container ID is typically issued by the container provider. Moreover, the container provider holds an electronic container provider certificate which function was already described in one of the previous paragraphs. Identification data as well as container provider certificate are already transferred to a permanent storage of the container's seal—which storage is also called log—and stored there.

In addition, the container provider holds a container control certificate in favor of the factory—also called factory container control certificate—for each container the factory wants to fill which certificate enables the factory to continue in the transportation chain and to transfer a certificate successfully on her part later on. Alternatively, the container provider issues a long term container control certificate to the factory. Such a long term container control certificate could comprise either an ID of the container along with an ID mask or a regular expression to describe a set of containers. Another possibility would be to just include a time span during which the factory is allowed to do container hand-overs. Any such factory container control certificate is transferred to the electronic seal by the container provider and stored there.

Optionally, and as indicated in FIG. 1 and FIG. 2 by dotted boxes, in addition to transferring a container control certificate to the electronic seal, a copy of any container control certificate might also be given directly from entity transferring authority of control to the entity receiving authority of control.

In general, each container control certificate comprises the public key of another entity allowed to perform a hand-over—that is: store a new control certificate—and the container ID of the container to be loaded. This implies that the container control certificate held by the container provider in favor of the factory comprises the public key of the factory as cryptographic data since the factory will be the next entity that needs to perform a hand-over of the container, and thus has to transfer authority of control for the container to a succeeding entity which will be in this particular case the carrier entity providing the truck C.

Truck C is the transportation means of choice in the present embodiment. Other transportation means could be e.g. trains, ships, etc. The carrier entity provides for each transportation means a location recording device—in this particular embodiment also called GPS beacon box—with a public-private key pair.

After loading goods into a container, the factory A stores into the electronic seal of the container the following data which data in its entirety is also called container loading manifest: A cargo manifest—i.e. a packing list—signed with the factory's own private key, and the container control certificate issued to the truck which is also called truck container control certificate. This truck container control certificate is generated based on the GPS beacon box's public-private key pair which in this embodiment represents the public-private key pair associated to the truck respectively the carrier entity, and is signed by the factory's private key. In addition, the factory A stores into the truck's GPS beacon box the newly generated container control certificate for the truck and the container ID. The truck's GPS beacon box can update the container's electronic seal because the electronic seal can verify the signed GPS pings with the truck's control certificate.

FIG. 2 illustrates a scenario of a further transfer of authority of control in the transportation chain: At the next hand-over station—for example, a shipping port—the truck prepares a suitable container control certificate for the entity taking over which is the port authority D and loads that into the electronic seal. The electronic seal will accept this new container control certificate because of the truck container control certificate stored previously in the electronic seal by the factory.

Truck C stores into a port authority's GPS beacon box the newly generated port authority container control certificate and the container ID. The port authority's GPS beacon box can update the container's electronic seal because the electronic seal can verify the signed GPS pings with the port authority's container control certificate, in particular due to the public key associated to the port authority stored being included in this certificate.

The electronic seal keeps a time stamped log of all container control certificate changes in addition to the storage of all received container control certificates.

Entities such as port authorities, ships, trucks, and so forth, that have network connectivity can at any point in time query the electronic seal of the container and trace back not only the GPS positions but also the control chain. The container provider retains ultimate authority over its containers.

Figure 3:
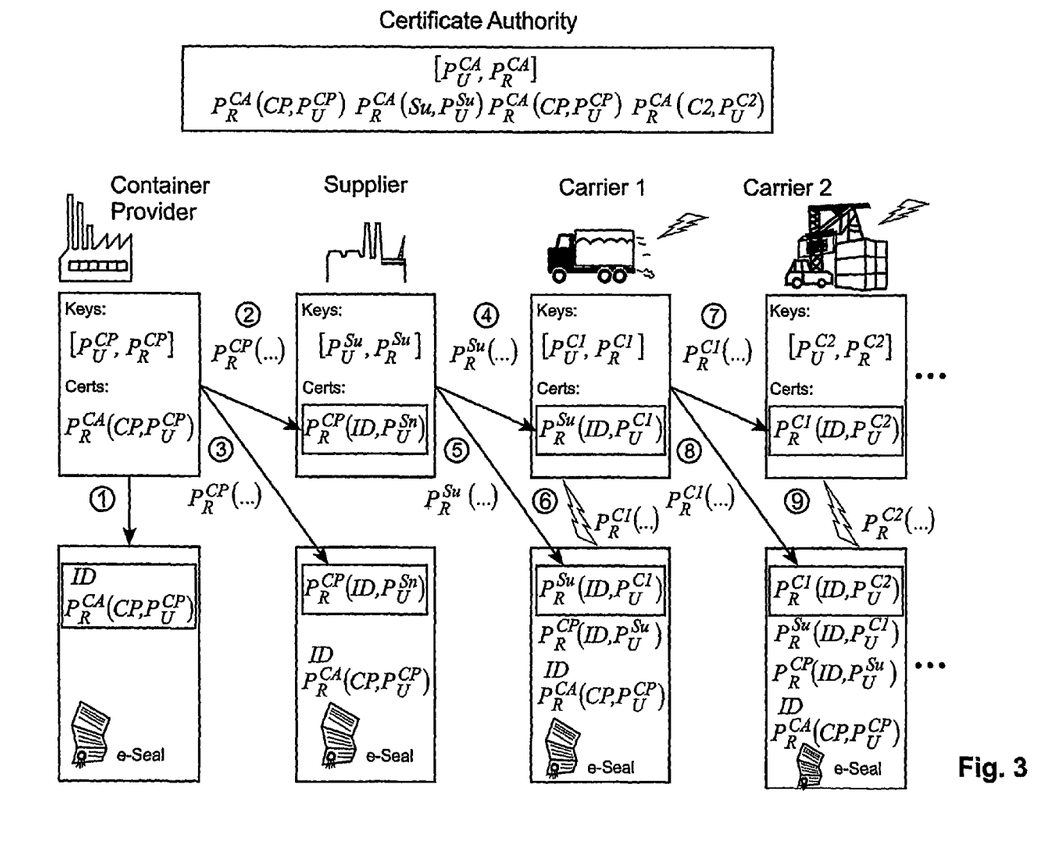

FIG. 3 shows a block diagram of a trade lane including different entities, illustrating the transfer of authority of control from one entity to the next one. In FIG. 3, a hand-over scenario is considered involving five types of entities.

The participating entities are introduced first: There is a container providing entity. The container provider manufactures cargo containers and provides the empty containers to the supplier of the goods. Each container comprises an electronic seal. Note, that in addition to the functions described with regard to this embodiment, the electronic seal may function as controller and/or monitor of the container lock. In this role, the electronic seal may actually control operations on the container lock based on rights associated with digital certificates or it simply monitors operations and records them in tamperproof storage for later verification.

A supplier loads the goods into the cargo-container for transportation to the consumer.

A carrier is a link along the transportation chain from supplier to consumer. Carriers broadcast authenticated, time stamped position fixes, so-called track points, to the electronic seals of the containers in order to establish an end-to-end track history for the container, which can be checked against trade lane policies. An example of a detailed implementation of location recording is given in connection with the scenario illustrated in FIG. 4.

A verifying entity checks the transport route that a container has taken by comparing the track history with the trade lane policy. A consumer unloads the goods from the cargo-container for consumption and/or further distribution.

Figure 4:
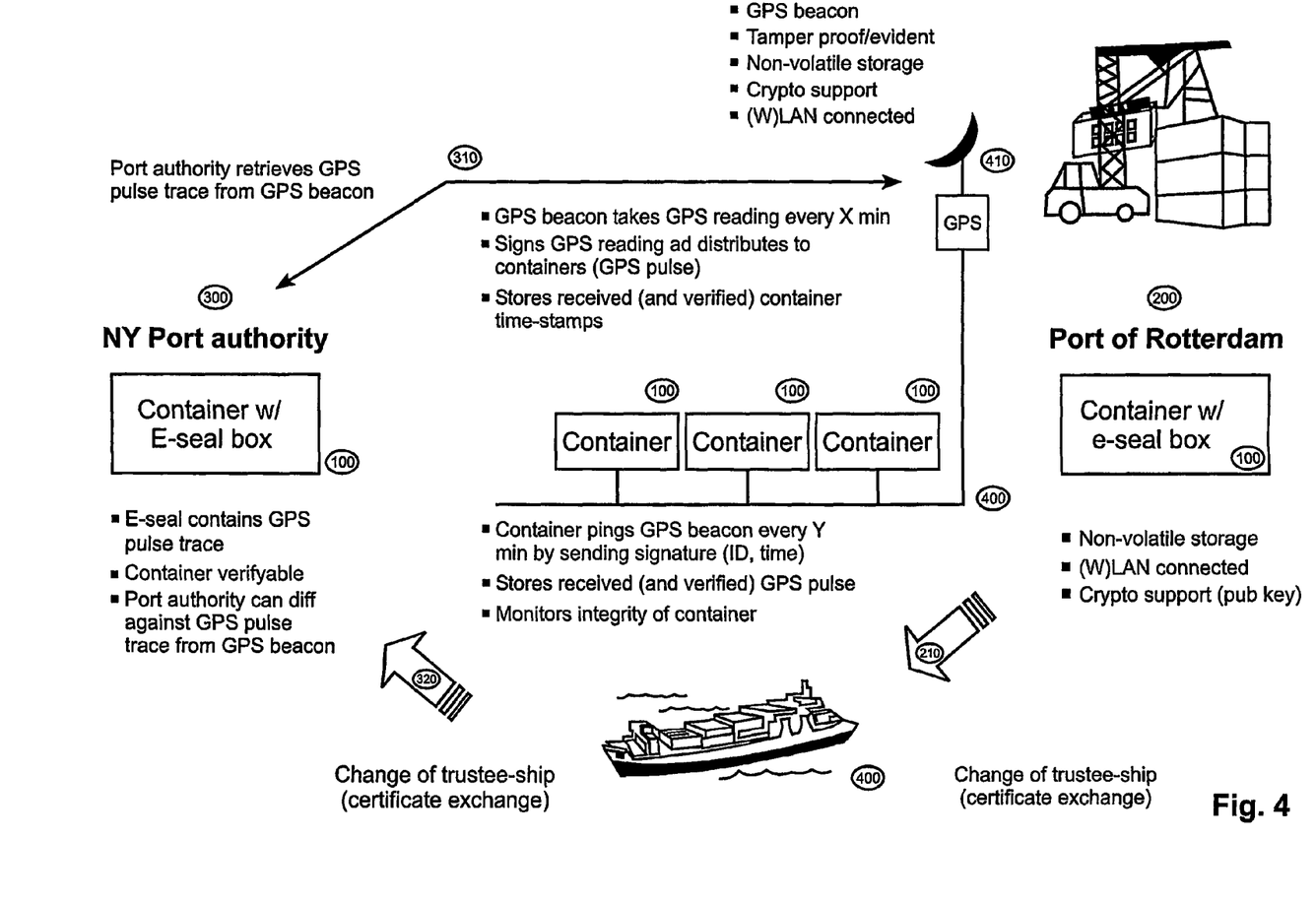

For a better understanding of the block diagram of FIG. 4, the notation related to cryptographic activities used in this diagram is explained first. The following notation is used to denote private-public key pairs and signed messages, respectively.

Private-public key pair belonging to the entity "entity":

$$|P_U^{entity}, P_R^{entity}|$$

wherein index "U" stands for "public", and index "R" stands for "private".

The following notation is used to denote signed messages, e.g. message "Msg" is signed with the private key of entity "entity":

$$P_R^{entity}(\text{Msg})$$

Generally, the secure hand-over procedure ensures that once the container leaves the place of the supplier of the goods, the electronic seal can record an authenticated time stamped log of all container control certificate changes and an authenticated track of time stamped position-fixes from the GPS-beacons of carriers transporting the container. Entities such as port authorities, ships, trucks, and so forth, that have network connectivity can at any point in time query the electronic seal of the container and trace back not only the GPS positions but also the control chain. The container provider retains ultimate authority over its containers.

FIG. 4 shows at the top the Certificate Authority CA, in the first row the entities handling the cargo-containers, and in the second row, the content of the electronic seal as it presents itself when an entity has been transferred authority-of-control.

The certificate authority is the certificate provider trusted by the entities which are in this example the container provider, the supplier, and the carriers. It is assumed that these entities have network connectivity to the certificate authority at the time a hand-over takes place. The certificate authority may be "originally issuing" and/or administrating certificates or parts of for participating entities. E.g. the certificate authority might issue the public—private key pairs for the participating entities, associates the public key with the identity to which the certificate is issued, and hands out in a secure manner the private key to the respective entity. Alternatively, every entity itself might create its key pair and carry the public key to the certificate authority for certification and further distribution. For practical reasons and scalability, it is not assumed that the electronic seal of the container has direct connectivity to the certificate authority. The chain of trust along which authority of control propagates along the container transport path must be maintained via a suitable hand over between carriers.

The overall hand-over procedure is initialized with the bootstrap step 1 between container provider and electronic seal and continues with the actual hand-overs from container provider to supplier in steps 2 and 3, from supplier to carrier1 in steps 4 and 5, from carrier1 to carrier2 in steps 7 and 8, and so on down the transport path. The GPS-beacons position fixes contributing to the track recorded in the electronic seal are shown for the carriers in steps 6 and 9. The technical means by which authority-of-control is propagated are digital certificates called container control certificates.

A container control certificate includes the ID of the container and the public key of the entity to which authority-of-control—which is basically understood as the authority to issue and store a new container control certificate—is transferred, signed with the private key of the transferring entity.

Associated with a container control certificate are a set of rights granted to the principal of the certificate. Such rights are, for instance, the right to read the track or a cargo-manifest from the electronic seals or to install new certificates into the electronic seal The latter is a right that must be granted to all entities involved in the hand-over procedure.

The bootstrap sequence consists of a single initialization step 1: The container provider installs a unique container D and its own container provider certificate signed with the private key of the certificate authority in the electronic seal. In essence, the container provider certificate constitutes the root of the certificate-based trust chain that the hand-over procedure below establishes as a result.

The hand-over sequence transfers authority-of-control from the party that has the authority to the party that obtains the authority next. It comprises the following steps:

Between the entities, such as in steps 2, 4 and 7: The entity transferring authority issues a container control certificate signed with its own private key on behalf of the entity obtaining authority. The arrows 2, 4 and 7 do not indicate a physical hand-over of the certificates between the entities in this embodiment but rather illustrate that the entity transferring authority of control is generating a container control certificate in favor of the subsequent entity, which container control certificate is physically transferred to the electronic seal only in steps 3, 5 and 8: The entity transferring authority installs a copy of the issued container control certificate in the electronic seal.

This hand-over sequence is repeated between every pair of consecutive container handling entities along the transport path to the consumer. It ensures that an uninterrupted, authenticated track can be recorded by the container's electronic seal.

Location recording capabilities of the system introduced: In the beacon-transmission sequence—indicated by steps 6 and 7—, a location recording device associated to the carrier entity and located at the transportation means sends time stamped authenticated position fixes periodically to the container's electronic seal.

Given the hand-over procedure described in the previous section, authenticity of authority-of-control and track points can be verified in the following manner, explained with regard to the steps depicted in FIG. 3 and numbered from 1 to 9: The container provider is a trusted entity, i.e., installation of the unique ID and the content provider's certificate does not rely on authentication—step 1. Trust of the supplier in the container provider is based on the content provider's certificate, which can be obtained from the certificate authority—step 2. Trust of the electronic seal in the supplier is based on the content provider's certificate installed in step 1. Trust of the obtaining entity in the transferring entity is based on the transferring entity's certificate, which the obtaining entity can get from the certificate authority—step 4/7. Trust of the electronic seal in the transferring entity is based on the transferring entity's certificate installed in step 3/5-step 5/7. Trust of the electronic seal in the beacon transmission is based on the carrier's certificate installed in step 5/8-step 6/9.

Container loading and unloading is performed by the supplier and consumer, respectively. These entities are granted the right to physically open the electronic seal and thus the container.

A cargo manifest is a inventory of the goods that the supplier has loaded into the container. The supplier stores a copy of the cargo manifest signed with its private key in the electronic seal. The consumer can retrieve the cargo manifest from the electronic seal in order to check the integrity of the container's load.

FIG. 4 shows a further scenario of container monitoring activities. Basically, there are of two different ways of container location recording introduced that can be combined or used stand-alone. Of course, each of these ways can be combined with any one of the different ways for documenting transfers of authority of control addressed earlier in this document.

The basic pieces of the embodiment according to FIG. 4 are the same for both ways of container location recording: There are containers 100, a container ship 400, a source port 200, a destination port 300. The availability of a global positioning system is assumed, the global positioning system providing worldwide position fixing services, such as the GPS system.

The first variant uses a tamperproof embedded computer inside each container, the electronic seal. Each electronic seal preferably comprises a network interface—either wireless were appropriate or wired, such as a one-wire serial bus or other—, a non-volatile storage also called log, and support for carrying out cryptographic operations such as public key cryptography. Each electronic seal also monitors the integrity of the corresponding container 100.

Containers 100 are initially stored at a port of origin 200—in FIG. 4 the Port of Rotterdam. When a container 100 gets loaded on board the container ship 400 the port of origin 200 installs a container control certificate for the container ship 400 in the electronic seal of the container in step 210, thereby transferring responsibility for the container to the vessel. This container control certificate comprises the ID of the respective container and the public key of the carrier represented by the container ship 400.

Each electronic seal connects via a network 420 to a tamperproof GPS beacon box 410 on board the ship. During the voyage from the port of origin 200 to the destination port 300—in FIG. 4 the Port of NY—the GPS beacon box 410 periodically takes GPS readings and stores the reading along with a time stamp in its non-volatile memory, and sends cryptographically signed GPS position information to the electronic seals that are attached to the containers 100. These transmittals are signed by the private key associated to the carrier/container ship, and thus also associated to the GPS beacon box 410, also called location recording device. Each electronic seal verifies that the GPS position is indeed coming from the GPS beacon box 410 by proper decryption of the GPS data—which is understood as validating the digital signature of the GPS beacon box 410 using the carriers public key stored in the seal's log and transferred to the seal's log by way of the container control certificate from the port of origin 200. If the location data could be verified successfully the electronic seal stores the GPS position in its non-volatile memory/log.

On arrival at the destination port 300, the destination port 300 retrieves a list of signed GPS readings from the GPS beacon box 410 along with status information—which might include whether the GPS beacon box 410 has been operating all the time, whether it has not been tampered with, etc. The destination port 300 then checks according to the data that the GPS beacon box 410 has staid within certain approved shipping lanes, that the journey has made continuous progress, etc. A risk management system can be used to automatically check for anomalies in the data. If the retrieved GPS trace is sound, the containers 100 can be unloaded; as each container 100 is unloaded, the container control certificate of the destination port authority is installed in the electronic seal of each container 100 and the stored GPS trace retrieved from it, step 320. If the GPS trace retrieved from each electronic seal is identical to the trace retrieved from the GPS beacon box 410 of the vessel 400 then conclusion is that the container 100 has staid with the container ship 400 during its voyage and, hence, inside the approved shipping lane.

The second variant has the electronic seals transmit cryptographically signed time stamps and IDs via the network 420 to the GPS beacon box 410. The GPS beacon box 410 stores each time stamp and ID in its non-volatile memory. On arrival the destination port authority retrieves the GPS trace along with the list of electronic seal IDs and time stamps and verifies that all electronic seals and hence their containing containers 100 were present all the time during the voyage and that the vessel did not deviate from the approved course.

Variant one has the advantage that each container 100 can be queried individually at any time and its history retrieved. Variant two has the advantage that the electronic seal does not have to have that much storage and that the GPS beacon box 410 has at all times an accurate list of containers 100 present on the vessel.

For optimal results variants one and two can be combined: That way each container 100 can be queried by itself if necessary and it is also known which containers 100 are present on the container ship 400 at any point in time.

The location recording mechanism can be extended in several ways:

A query interface at the GPS beacon box 410 can allow third parties to retrieve the list of currently registered and present containers 100 via a satellite link—or a mobile phone link in coastal waters—which is interesting for logistical planning and insurance purposes.

Complete transport food chains can be covered from the source—i.e., the entity filling the container—to the sink—i.e. the recipient.

A stripped down version just using variant two and RFID tags can be used for Quality of Services QoS/tracking purposes with postal/courier systems.

Figure 5:
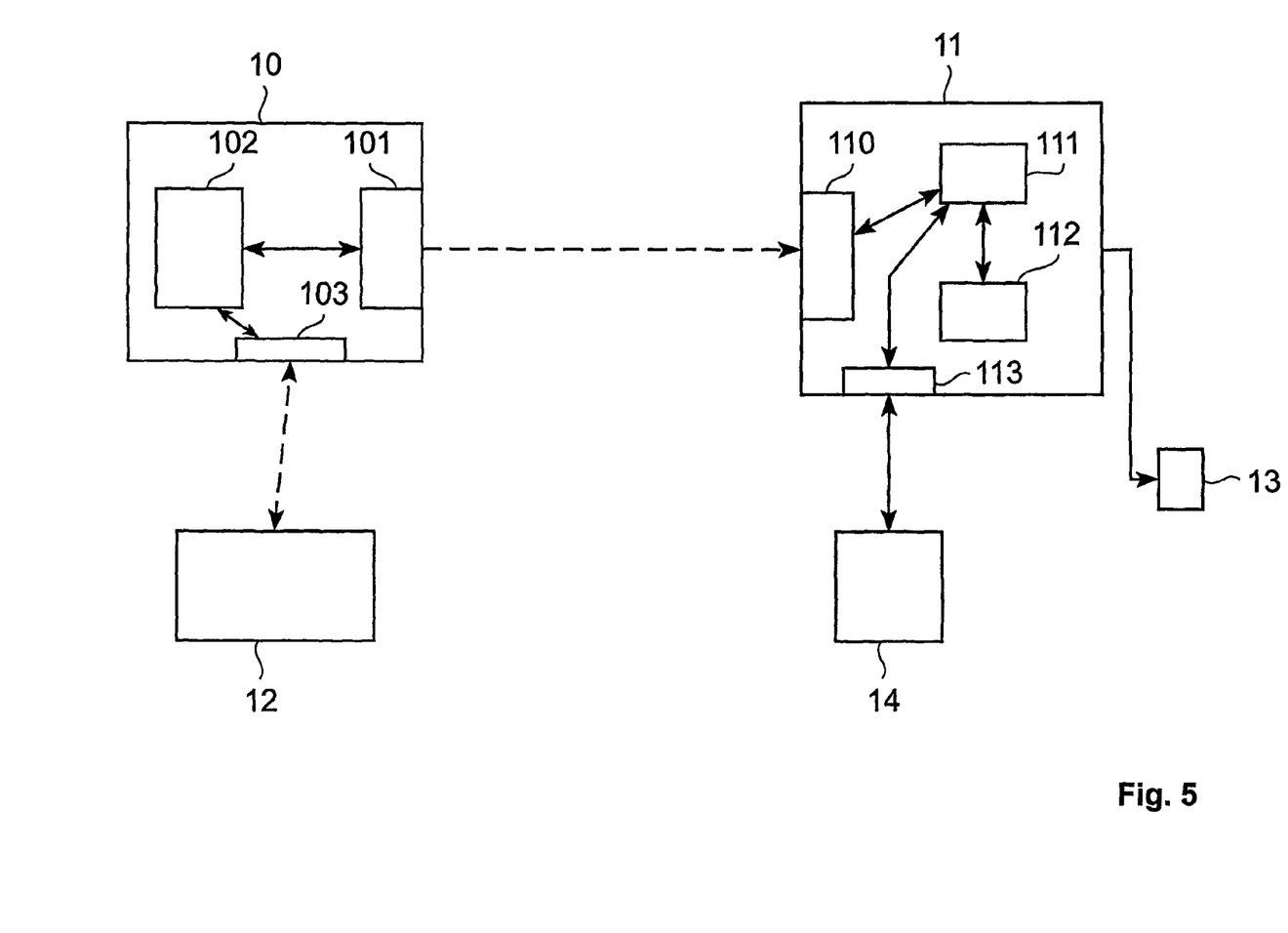

FIG. 5 shows a computing unit 10 associated to an entity of a transportation chain in communication with an electronic seal 11 associated to a container: The computing unit 10 comprises an interface 101 for transferring data to the electronic seal 11, which data is in particular s container control certificate. A control unit 102 assembles the certificate wherein the term assembling includes a scenario where the computing unit receives the certificate as such from another authority such as a certificate authority as referred to in FIG. 5 with the reference 12 via an appropriate interface 103, and then digitally signs the certificate with the associated entity's private key. The signed certificate is sent to the interface 101 where it is sent from to the corresponding interface 110 of the electronic seal 11. The electronic seal comprises a control unit 111 and a log 112. The seal's control unit 111 verifies the data received from the interface 110 with the help of decrypt data already stored in the log 112. In case the verification succeeds, the control unit causes the encrypted data to be stored in the log 112.

The control unit 111 might control e.g. a lock 13 of the associated container via a suitable interface and subject to the result of the verification process.

Via another interface 113, the control unit 111 might communicate with a location information recorder 14.

Any control unit mentioned with regard to one or more of the apparatus involved can be realized as purely hardwired embodiment, as a combination of software and hardware implemented functions, or as bare software functions being executed on a controller hardware.

The invention claimed is:

1. A method for documenting a transfer of authority of control for a container from a first entity of a transportation chain to a second entity of the transportation chain, the method comprising:

receiving through an interface of an electronic seal associated with the container an electronic container control certificate associated with the first entity, the electronic seal including a log that records data and a control unit that verifies data received through the interface, the electronic container control certificate comprises a cryptographic key associated to the second entity and identification data for the container, and which container control certificate is digitally signed by the first entity;

receiving in the electronic seal associated with the container, geographic location data from a location recording device associated with one of the first and second entities;

storing the container control certificate in the log of the electronic seal; and verifying the signed container control certificate by a corresponding function implemented in the electronic seal, wherein the container control certificate is stored in the log if the verification succeeds and if the verification fails, the container control certificate is not stored in the log.

2. Method according to claim 1, comprising verifying the digital signature of the container control certificate by applying decrypt information stored in the log of the electronic seal and delivered to the log by a previous entity of the transportation chain.

3. Method according to claim 2, wherein the verification is considered to be failed if the signed container control certificate cannot be decrypted with the decrypt information stored in the log.

4. Method according to claim 1, wherein a status of a container lock is subject to the result of the signature verification process.

5. Method according to claim 1, wherein the electronic seal issues a warning if the verification of the signature fails.

6. Method according to claim 1, wherein the cryptographic key associated to the second entity is used by the electronic seal for decrypting data received from the second entity.

7. Method according to claim 1, wherein the electronic seal is designed for controlling a lock of the container.

8. Method according to claim 1, wherein an asymmetric cryptographic key system is used for digitally signing the container control certificate.

9. Method according to claim 8, wherein a public—private key system is used for digitally signing the container control certificate.

10. Method according to claim 9, wherein the container control certificate is signed using a private key associated to the first entity.

11. Method according to claim 2, wherein the container control certificate is signed using a private key associated to the first entity and the decrypt information stored in the log comprises a public key of the first entity.

12. Method according to claim 1, wherein the first entity receives the cryptographic key associated to the second entity from a certificate authority.

13. Method according to claim 1, wherein the location data is digitally signed by the associated entity.

14. Method according to claim 13, wherein the location data digitally signed by the associated entity is stored in the log of the electronic seal.

15. Method according to claim 13, comprising verifying the location data digitally signed by the associated entity by the corresponding function implemented in the electronic seal.

16. Method according to claim 15 comprising verifying the digital signature of the location data by applying decrypt information stored in the log of the electronic seal and delivered to the log by a previous entity of the transportation chain.

17. Method according to claim 15, wherein the verification is considered to be failed, if the signed location data cannot be decrypted with decrypt information stored in the log.

18. Method according to claim 15, wherein recording the location data in the log of the electronic seal is subject to a result of verifying the signed container control certificate.

19. Method according to claim 1, wherein the electronic seal transmits container identification information to a location recording device associated to one of the entities.

20. Method according to claim 19, wherein the transmitted container identification information is digitally signed by the second entity.

* * * * *